United States Patent Office 3,274,265
Patented Sept. 20, 1966

3,274,265
FLUORINATED ORGANIC COMPOUNDS
John Colin Tatlow and Robert Stephens, Birmingham, England, assignors to National Research Development Corporation, London, England, a corporation of Great Britain
No Drawing. Filed Nov. 23, 1962, Ser. No. 239,780
Claims priority, application Great Britain, Nov. 27, 1961, 42,293/61
10 Claims. (Cl. 260—648)

This invention relates to fluorinated organic compounds and is concerned with the production of useful polymerisable alicyclic compounds which have not hitherto been synthesised.

The invention comprises conjugated polyfluoroalicyclic compounds having one or more of the groups $=CR_1R_2$ attached to a nuclear carbon atom wherein $R_1$ and $R_2$, which may be the same or different, represent hydrogen fluorine, or alkyl groups, the radical $CR_1R_2$ containing a maximum of 5 carbon atoms. Examples of such compounds are monocyclic compounds having the structures

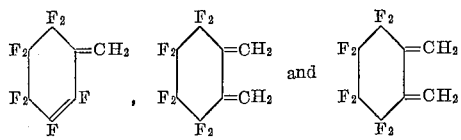

which have only two double bonds, which two double bonds are in the form of a single unsaturated conjugation which includes at least one group of the formula $=CR_1R_2$ connected to a nuclear carbon atom.

Compounds defined as above are produced, in accordance with the invention, by treating a polyfluoroalicyclic compound having a structure which comprises the grouping

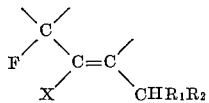

e.g. as in the monocyclic system

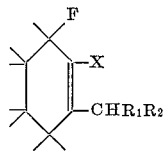

wherein $R_1$ and $R_2$ have the above mentioned significance and the radical X represents fluorine or an α-haloalkyl group (preferably fluoroalkyl or chloroalkyl) to effect a 1:4 dehydrohalogenation involving the hydrogen atom of the group —$CHR_1R_2$. Where X represents fluorine, 1:4 elimination involves a nuclear fluorine atom as shown below in Figure 1. Where X represents haloalkyl, however, 1:4 elimination of the type illustrated in Figure 2 occurs.

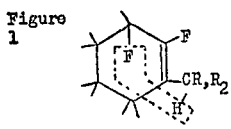 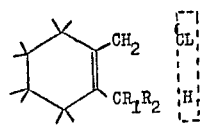

Figure 1    Figure 2

Dehydrohalogenation is conveniently carried out by heating the starting material in the presence of an alkali metal fluoride, or other metal fluoride, for example by passing the vapour of the compound over an alkali metal fluoride (for instance sodium potassium or lithium fluoride) at a temperature from about 300° to about 600° C. By such means, a 1-alkylpolyfluorocycloalkene is converted into a 3-alkylidenepolyfluorocycloalkene. Dehydrohalogenation by this method may also be used to produce compounds having two alkylidene substituents by 1:4 elimination of the type illustrated in Figure 2 above.

Elimination of the type illustrated in Figure 2 may also be effected by other methods, e.g. by treatment with aqueous alkali.

The starting materials for use in the process in this invention are conveniently prepared by alkylation of a polyfluorocycloalkene by treatment with a lithium alkyl or other alkali metal alkyl in an inert solvent at subnormal temperature followed, if desired, by halogenation of the alkyl substituent by known methods.

In contrast to known cyclofluoro-olefines the compounds of this invention polymerise readily giving polymers which are film forming, which have especially good thermal resistance, and which in some cases are highly crystalline. The polymerisation may be conducted by known methods and may be initiated by means of free radical initiators, heat, or ultra-violet irradiation. In addition it has been found that if the alkali metal fluoride-promoted reaction described above is carried out by heating for an extended period in a polar solvent the reaction product polymerises in situ to form the same kind of polymer as produced by the methods indicated above. This product, by further loss of one molecule of hydrogen fluoride per unit of polymer chain, is converted into a highly conjugated polyene which is usually black, soluble in organic solvents, film forming, and having good thermal and electrical properties.

Compounds in accordance with the invention containing two substituents of formula $=CR_1R_2$ wherein $R_1$ and $R_2$ respresent fluorine in both substituents or fluorine in one substituent and hydrogen in the other substituent may also be prepared. For example 1-trifluoromethyl-perfluorocyclohexene may be methylated with methyl lithium to give the corresponding 1-trifluoromethyl-2-methyl compound which is then subjected to 1:4 elimination of HF between the substituents to give 1-difluoromethylene-2-methyleneoctafluorocyclohexane. Again 1-trifluoromethyl-2 - methyl - octafluorocyclohexane can be chlorinated in the presence of ultra-violet light to chlorinate the double bond and convert the methyl substituent into a dichloromethyl group whereupon after removal of the nuclear chlorine substituents to regenerate the double bond the intermediate may then be converted with a fluorinating agent such as antimony pentafluoride to convert the dichloromethyl group into difluoromethyl. The compound so obtained is then convertible by 1:4 elimination of HF into 1,2-bis(difluoromethylene)-octafluorocyclohexane.

The invention will now be further described with reference to detailed examples.

Example 1

Decafluorocyclohexene is treated with a slight molar excess of methyl lithium in diethyl ether at —70° C. to give 1-methylnonafluorocyclohexene (85% yield) B.P. 90.5° C. This compound (12 g.) is passed over sodium fluoride, at 420° C., in a stream of nitrogen flowing at 1.2 l./hr. to give recovered starting material (8 g.), and 3-methyleneoctafluorocyclohexene (0.9 g.), B.P. 98° C. Comparable results are obtainable with potassium fluoride as a promoter of the reaction.

1-methylnonafluorocyclohexene (5 g.) is heated under reflux with dry potassium fluoride (5 g.) in dimethyl formamide (25 cc.) for 14 hrs. The mixture is then poured into an excess of dilute hydrochloric acid and the aqueous phase extracted continuously with ether for 16 hrs. Evaporation of the ether gives the polymer.

*Example 2*

Decafluorocyclohexene is treated with a threefold molar excess of methyl lithium in diethyl ether at −78° to give 1,2-dimethyloctafluorocyclohexene (62%), B.P. 135°. This compound with chlorine in a sealed tube under ultraviolet light for four hours gives 1-chloromethyl-2-methyl-octafluorocyclohexene (26%), B.P. 162° and this in turn with aqueous alkali gives 1,2-dimethyleneoctafluorocyclohexane (28%) B.P. 124°. The latter in an atmosphere of nitrogen and with azo-bis-isobutyronitrile (1%) at 60° gives after 50 hr. a white polymer (55%) with high crystallinity.

We claim:

1. Process for the production of a polyfluoroalicyclic compound having conjugated unsaturation including at least one group of formula $=CR_1R_2$ connected to a nuclear carbon atom, wherein $R_1$ and $R_2$ are selected from the group consisting of hydrogen, fluorine and lower alkyl groups, the radical $CR_1R_2$ having a maximum of 5 carbon atoms which comprises dehydrohalogenating a corresponding alicyclic compound of the structure

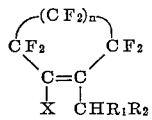

wherein $n$ is an integer of from 1 to 2 and $R_1$ and $R_2$ have the aforementioned significance and X is selected from the group consisting of fluorine and an α-haloalkyl group with an alkali metal fluoride selected from the group consisting of sodium, potassium and lithium fluorides at a temperature between 200–600° C. until dehydrohalogenation by 1:4 elimination is effected.

2. The process of claim 1 in which the polyfluoroalicyclic compound having conjugated unsaturation is 3-methylene-octafluorocyclohexane and the corresponding alicyclic compound which is dehydrohalogenated is 1-methylnonafluorocyclohexene.

3. The process of claim 1 in which the polyfluoroalicyclic compound having conjugated unsaturation is 1,2-dimethylene-octafluorocyclohexane and the corresponding alicyclic compound which is dehydrohalogenated is 1-chloromethyl-2-methyl octafluorocyclohexene.

4. The process of claim 1 in which the polyfluoroalicyclic compound having conjugated unsaturation is 1,2-bis(difluoromethylene) - octafluorocyclohexane and the corresponding alicyclic compound which is dehydrohalogenated is 1,2-bis(difluoromethyl)-octafluorocyclohexene.

5. The process of claim 1 in which the polyfluoroalicyclic compound having conjugated unsaturation is 1-methylene - 2 - difluoromethylene-octafluorocyclohexane and the corresponding alicyclic compound which is dehydrohalogenated is 1-methyl-2-difluoromethyl-octafluorocyclohexene.

6. A polyfluoroalicyclic compound of a structure selected from the group consisting of

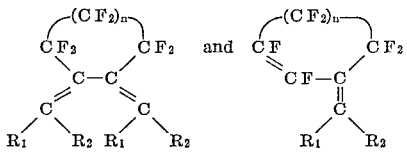

wherein $n$ is an integer of from 1 to 2 and $R_1$ and $R_2$ are selected from the group consisting of hydrogen, fluorine and lower alkyl groups, the radical $CR_1R_2$ having a maximum of 5 carbon atoms.

7. 3-methylene-octafluorocyclohexane.
8. 1,2-dimethylene-octafluorocyclohexane.
9. 1,2-bis(difluoromethylene)-octafluorocyclohexane.
10. 1-methylene-2-difluoromethylene - octafluorocyclohexane.

References Cited by the Examiner
UNITED STATES PATENTS 3,053,909   9/1962   Davis et al. _____ 260—648

FOREIGN PATENTS 619,394   3/1949   Great Britain.

OTHER REFERENCES

Blomquist et al., "J. Am. Chem. Soc.," vol. 79, pp. 4976–80 (1957).

Nazarov et al., "Zhur Obshchei Khim," vol. 29, pp. 767–75.

LEON ZITVER, *Primary Examiner.*

K. H. JOHNSON, K. V. ROCKEY, *Assistant Examiners.*